(12) United States Patent
Smith

(10) Patent No.: US 9,923,715 B2
(45) Date of Patent: Mar. 20, 2018

(54) SYSTEM, APPARATUS AND METHOD FOR GROUP KEY DISTRIBUTION FOR A NETWORK

(71) Applicant: Intel Corporation, Santa Clara, CA (US)

(72) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 14/863,043

(22) Filed: Sep. 23, 2015

(65) Prior Publication Data

US 2016/0365975 A1   Dec. 15, 2016

Related U.S. Application Data

(60) Provisional application No. 62/172,883, filed on Jun. 9, 2015.

(51) Int. Cl.
*H04L 9/08* (2006.01)
*H04L 29/06* (2006.01)

(52) U.S. Cl.
CPC .......... *H04L 9/0833* (2013.01); *H04L 9/0822* (2013.01); *H04L 9/0841* (2013.01);
(Continued)

(58) Field of Classification Search
None
See application file for complete search history.

(56) References Cited

U.S. PATENT DOCUMENTS 8,713,669 B2 * 4/2014 Guichard ............ H04L 63/0272
380/277
9,356,778 B2 * 5/2016 Vanstone .............. H04L 63/065
(Continued)

FOREIGN PATENT DOCUMENTS

WO   2014017959   1/2014

OTHER PUBLICATIONS

International Searching Authority, "Notification of Transmittal of the International Search Report and the Written Opinion of the International Searching Authority," dated Jul. 26, 2016 in International application No. PCT/US2016/031710.
(Continued)

*Primary Examiner* — Christopher Revak
*Assistant Examiner* — Vadim Savenkov
(74) *Attorney, Agent, or Firm* — Trop, Pruner & Hu, P.C.

(57) ABSTRACT

An embodiment includes receiving, in a first key management device (KMD) of a first autonomous network associated with a first realm, a request for a group key to enable content to be shared between one or more first devices of the first autonomous network and one or more second devices of a second autonomous network associated with a second realm, the second autonomous network having a second KMD; creating the group key and providing the group key to the one or more first devices from the first KMD; establishing a temporal key to be used to establish a secure channel between the first KMD and the second KMD; and delivering the group key to the second KMD from the first KMD via the secure channel, to enable the second KMD to provide the group key to the one or more second devices. Other embodiments are addressed herein.

22 Claims, 9 Drawing Sheets

(52) U.S. Cl.
CPC ........ *H04L 63/065* (2013.01); *H04L 63/0869* (2013.01); *H04L 2463/062* (2013.01)

(56) References Cited

U.S. PATENT DOCUMENTS

| | | | |
|---|---|---|---|
| 2007/0253376 | A1 | 11/2007 | Bonta et al. |
| 2008/0159542 | A1* | 7/2008 | Ito .................. H04L 9/0894 380/279 |
| 2008/0273487 | A1* | 11/2008 | Naghian ............... H04W 84/08 370/328 |
| 2010/0153736 | A1 | 6/2010 | Liu et al. |
| 2011/0182427 | A1 | 7/2011 | Long et al. |
| 2013/0212378 | A1* | 8/2013 | Falk ................... H04L 63/0272 713/155 |
| 2013/0294284 | A1* | 11/2013 | Popa ................... H04L 63/065 370/254 |
| 2015/0188700 | A1* | 7/2015 | Ben Saied ........... H04L 9/0838 380/44 |

OTHER PUBLICATIONS

Wikipedia, "OSI Model", https://en.wikipedia.org/wiki/OSI_model#Layer_4:_Transport_Layer, Jun. 8, 2015, 7 pages.
Wikipedia, "Key Management", https://en.wikipedia.org/wiki/Key_management, May 19, 2015, 5 pages.
Wikipedia, "Publish—Subscribe Pattern", https://en.wikipedia.org/wiki/Publish%E2%80%93subscribe_pattern, Mar. 18, 2015, 4 pages.
Wikipedia, "Data Distribution Service", https://en.wikipedia.org/wiki/Data_Distribution_Service, May 21, 2015, 5 pages.
Wikipedia, "Kerberos (Protocol)", https://en.wikipedia.org/wiki/Kerberos_%28protocor%29, May 7, 2015, 6 pages.
Stackexchange, "Cryptography", http://crypto.stackexchange.com/questions/3682/how-can-the-diffie-hellman-key-exchange-be-extended-to-three-parties, Aug. 30, 2012, 1 page.
Wikipedia, "XMPP", https://en.wikipedia.org/wiki/XMPP, May 22, 2015, 7 pages.
IBM Mobilefirst, "Pairwise and Group Keys", http://etutorials.org/Networking/802.11+security.+wi-fi+protected+access+and+802.11i/Part+II+The+Design+of+Wi-Fi+Security/Chapter+10.+WPA+and+RSN+Key+Hierarchy/Pairwise+and+Group+Keys/, accessed Sep. 3, 2015, 6 pages.
Hardjono, et al., "Fluffy: Simplified Key Exchange for Constrained Environments", draft-hardjono-ace-fluffy-00, Mar. 23, 2015, 24 pages, Intel Corporation.
Openinterconnect.org, "Open Interconnect Consortium: An Overview to Connect Devices Everywhere", http://openinterconnect.org/wp-content/uploads/2015/07/Open-Interconnect-ConsortiumOverview_Final-.pdf, Jul. 2015, 7 pages.
Openinterconnect.org, "The Open Interconnect Consortium and IoTivity", http://openinterconnect.org/wp-content/uploads/2015/07/OIC-IoTivity_White-Paper_Final1.pdf, Jul. 2015, 5 pages.
Openinterconnect.org, "Cloud-Native Architecture and the Internet of Things", http://openinterconnect.org/wp-content/uploads/2015/07/Cloud-Native-IoT-White-Paper_white_centered_Final.pdf, Jul. 2015, 3 pages.
Openinterconnect.org, "Freedom to Implement: OIC and IoTivity", http://openinterconnect.org/wp-content/uploads/2015/07/OIC-IoT-Standards-and-Implementation_White-Paper_Final.pdf, Jul. 2015, 2 pages.
U.S. Appl. No. 14/864,940, filed Sep. 25, 2015, entitled "System, Apparatus and Method for Secure Network Bridging Using a Rendezvous Service and Multiple Key Distribution Servers" by Ned M. Smith, et al.
U.S. Appl. No. 14/864,957, filed Sep. 25, 2015, entitled "System, Apparatus and Method for Managing Lifecycle of Secure Publish-Subscribe System" by Ned M. Smith, et al.
U.S. Appl. No. 14/865,576, filed Sep. 25, 2015, entitled "System, Apparatus and Method for Secure Coordination of a Rendezvous Point for Distributed Devices Using Entropy Multiplexing" by Ned M. Smith, et al.
U.S. Appl. No. 14/865,191, filed Sep. 25, 2015, entitled "System, Apparatus and Method for Multi-Owner Transfer of Ownership of a Device" by Jesse Walker, et al.
U.S. Appl. No. 14/865,198, filed Sep. 25, 2015, entitled "System, Apparatus and Method for Transferring Ownership of a Device From Manufacturer to User Using an Embedded Resource" by Ned M. Smith, et al.
U.S. Appl. No. 14/856,857, filed Sep. 17, 2015, entitled "System, Apparatus and Method for Access Control List Processing in a Constrained Environment" by Ned M. Smith, et al.
U.S. Appl. No. 14/859,572, filed Sep. 21, 2015, entitled "System, Apparatus and Method for Privacy Preserving Distributed Attestation for Devices" by Ned M. Smith, et al.
U.S. Appl. No. 14/863,496, filed Sep. 24, 2015, entitled "System, Apparatus and Method for Stateful Application of Control Data in a Device" by Nathan Heldt-Sheller, et al.
U.S. Appl. No. 14/998,275, filed Dec. 26, 2015, entitled "System, Apparatus and Method for Auto-Optimization of Access Control Policy and Key Management in a Network Authoring Tool" by Ned M. Smith, et al.
U.S. Appl. No. 15/045,676, filed Feb. 17, 2016, entitled "System, Apparatus and Method for Security Interoperability Path Analysis in an Internet of Things (IOT) Network" by Ned M. Smith, et al.
U.S. Appl. No. 62/172,962, filed Jun. 9, 2015, entitled "Providing Protected Content in an IoT Network" by Ned M. Smith, et al.
U.S. Appl. No. 14/968,125, filed Dec. 14, 2015, entitled "A Self-Configuring Key Management System for an Internet of Things Network" by Ned M. Smith.
U.S. Appl. No. 14/757,750, filed Dec. 23, 2015, entitled "System, Apparatus and Method for Optimizing Symmetric Key Cache Using Tickets Issued by a Certificate Status Check Service Provider" by Ned M. Smith, et al.
U.S. Appl. No. 14/976,165, filed Dec. 21, 2015, entitled "System, Apparatus and Method for Migrating a Device Having a Platform Group" by Ned M. Smith, et al.
U.S. Appl. No. 14/977,742, filed Dec. 22, 2015, entitled "System, Apparatus and Method for Safety State Management of Internet Things (IoT) Devices " by Ned M. Smith, et al.
Wikipedia, "Tor", https://en.wikipedia.org/wiki/Tor_%28anonymity_network%29 , Jun. 4, 2015, 14 pages.
Networkworld, "A guide to the confusing Internet of Things standards world", http://www.networkworld.com/article/2456421/internet-of-things/a-guide-to-the-confusing-internet-of-things-standards-world.html, Jul. 21, 2014, 7 pages.

* cited by examiner

SYSTEM, APPARATUS AND METHOD FOR GROUP KEY DISTRIBUTION FOR A NETWORK

CROSS-REFERENCE TO RELATED APPLICATION

This application claims priority to U.S. Provisional Patent Application No. 62/172,883 filed on Jun. 9, 2015 and entitled "SYSTEM, APPARATUS AND METHOD FOR GROUP KEY DISTRIBUTION FOR A NETWORK", the content of which is hereby incorporated by reference.

BACKGROUND

Internet of Things (IoT) networks include a plurality of constrained and unconstrained devices that operate autonomously or semi-autonomously as a collection or grouping of devices. Command and control is often distributed among the devices and may not require a central controller. Secure operation of an IoT network is becoming a concern. Existing key management infrastructures typically require a central key server or certification authority that ensures keys are provisioned across computers that may need to engage in some collaborative exchange. Such systems may prove unwieldy for an IoT network.

Further, IoT networks are differentiated from content networks (i.e., networks with a large distributed system of servers deployed in multiple data centers across the Internet), in that IoT devices often have constrained environments that lack user credentials or the ability to solicit a user credential to authenticate and authorize the exchange of a group key.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

DETAILED DESCRIPTION

Figure 1:
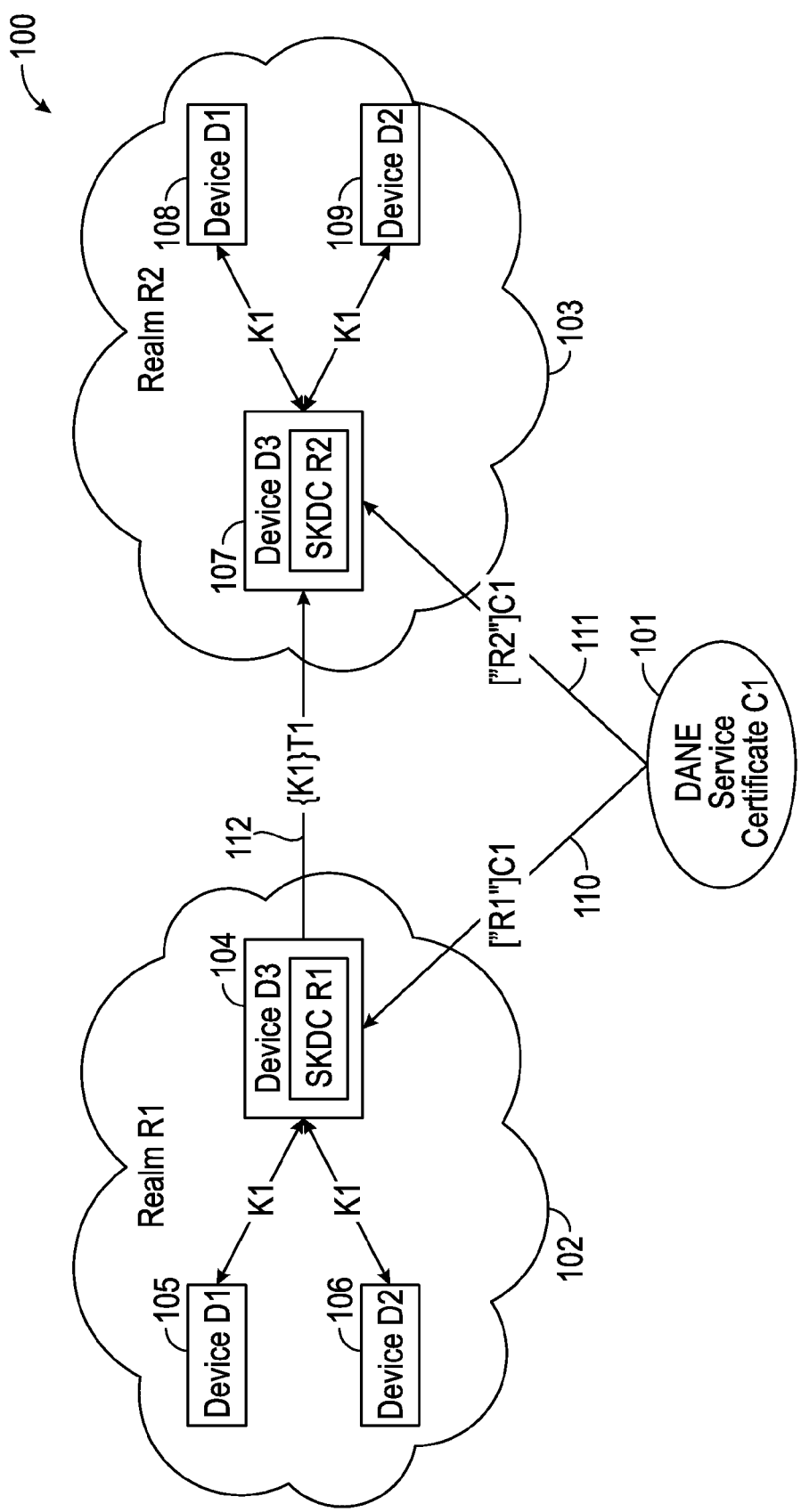
FIG. 1 is a block diagram of a system overview in an embodiment.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

In various embodiments, a group key management architecture may be used to distribute key management for a group of IoT devices that operate autonomously. In an embodiment, a simple key distribution center (SKDC), which is a service that can be implemented efficiently on an existing device in an autonomous group of IoT devices, may be used to perform key management. Devices are expected to have previously established pair-wise keys for device-to-device communications. The device hosting the SKDC capability is chosen such that all devices within the autonomous grouping share a pair-wise key with the SKDC device. When a device (A) desires to share content with other devices (B and C), the devices follow a protocol for instantiating a group key (K1) that is shared across devices A, B and C, where A may use it to encrypt content that can be consumed by the remaining group members B and C.

The "context" for content distribution is also specified. This context is also referred to herein as the "topic" of information exchange. The autonomous grouping of IoT devices may also be specified and referred to as a "realm" of devices. The SKDC device is considered to be the realm namespace authority. The realm name may be assigned by a management and authoring tool that has a user interface and may support user accounts. The authoring tool may make the namespace assignment to SKDC devices. Alternatively, a naming service such as the service proposed by RFC6698-DNS-Based Authentication of Named Entities (DANE), may be used to reserve a realm name that is distinguished from another autonomous IoT device groupings to ensure realm namespaces do not conflict.

Conflicting namespaces may pose a security problem when devices from different realms are to interact. For example, if a device D1 in realm R1 is to interact with a device D2 in realm R2, the combination of realm and device name disambiguates the devices (e.g., D1:R1 and D2:R2 respectively). If a group of devices is to be formed across multiple realms, disambiguation may be performed (e.g., the group G1=[D1:R1, D2:R1, D1:R2, D2:R2]).

The SKDC of R1 and SKDC of R2 may interact to dynamically establish a context of secure interoperation based on a dynamic exchange of Diffie-Hellman (DH) keys between an SKDC for R1 and an SKDC for R2. The shared group key K1 may be securely distributed to SKDC:R2 via SKDC:R1 so devices in R2 need not have a pre-shared key with R1. Devices D1:R1 and D2:R1 rely on the SKDC in R1 for group key K1 assignments and devices D2:R2 and D1:R2 rely on the SKDC in R2 for group key assignments involving the same group key K1.

In an embodiment, the protocol for requesting a group key using an SKDC may be defined in different manners, such as by a simplified key exchange protocol, e.g., Fluffy: Simplified Key Exchange for Constrained Environments, draft-hardjono-ace-fluffy-00 (draft IETF Specification Mar. 23, 2015 at https://tools.ietf.org/id/draft-hardjono-ace-fluffy-00***txt). The protocol messages are described below. The messaging structures do not depend on another security protocol for integrity, confidentiality and replay protection. Hence these messages may be used over any unsecured transport. However, these key exchange messages are not authenticated, in an embodiment.

Instead, device authentication may be realized by controlling the method in which devices are introduced into the IoT network using a device on-boarding tool. In this case, each device receives an identity (D1, D2, and the like) and a symmetric key that is shared with the SKDC device. The on-boarding tool asserts authenticity of the devices and provisions a device specific key (e.g., DK1→D1). DK1 can be used by SKDC to authenticate D1 when requests for a group key are made.

Embodiments thus enable an autonomous IoT network to make authenticated requests for group keys to share content among a plurality of devices within the autonomous network using a SKDC service that is operated by one of the existing devices in the autonomous network. Cross-realm device participation in a virtual group of a subset of devices in one autonomous network and a subset of devices in a second autonomous network may be realized. This may be achieved by SKDC services of the respective realms performing a DH exchange to dynamically establish a temporal key T1 that may be used to establish a secure channel between realms R1 and R2 over which requests for group keys can be made by a remote SKDC to re-issue K1 to the remote devices. The remote devices of R2 need not be authenticated to the first SKDC. The SKDC realm namespaces may be disambiguated using a DANE service that establishes realm names such that an imposter cannot assert a realm name already legitimately assigned to R1 and R2. For example, a device in R1 may rely on a certificate from the DANE service before seeking a group key to communicate with a device in R2.

Embodiments thus perform distributed key management of group keys assigned to IoT devices without introducing a dependence on a user credential. Embodiments may also support autonomous operation within intra-realm group keys using an SKDC service that may be operated by an existing device (or by a new device dedicated for this purpose). Still further, embodiments support dynamic establishment of a virtual realm/group context where devices of a first realm interact with devices of a second realm using a common group. Embodiments may further support disambiguated realm namespaces using a DANE service that reserves realm names according to a namespace registry, but where the registry is not trusted to know group key values or to authenticate devices to a realm authority. Thus, a server node such as a node hosting the DANE service may help with naming the realms and devices, the actual obtaining and distributing of the group key is done without reliance on a certificate authority or a central key server.

In an embodiment, at least one IoT network of devices operates autonomously and securely. Devices may interact by sharing content and command-and-control messages among some or all devices within the IoT network. The devices rely on a SKDC function that may be hosted by an existing IoT device or by a new device dedicated for this function. The SKDC accepts requests to create a group key K1 using a combination of four messages: a) GroupKeyRequest; b) GroupKeyResponse; c) GroupKeyFetch; and d) GroupKeyDeliver. Each of these messages is described below.

The SKDC authenticates GroupKeyRequest and GroupKeyFetch messages using a pre-shared key established by a device on-boarding tool that attests the device security capabilities as well as establishes a device name and pre-shared shared key. The on-boarding tool may provision the SKDC with a list of all the devices (name and pre-shared key (PSK)) so that IoT devices are subsequently able to make group key management functions. A PSK is a shared secret which was previously shared between the two parties using some secure channel before it needs to be used. Likewise, the SDKC device PSK may be provisioned with each device in the IoT network so that the GroupKeyResponse and GroupKeyDeliver messages may be authenticated by the IoT devices.

In an embodiment, the SKDC is assigned a namespace, also known as a realm, such that the realm name and device name disambiguate devices in realm R1 from devices in a second realm R2. A DANE service may be employed to register realm names in a universal registry that ensures R1 and R2 are not given the same name. Name disambiguation allows realms to assert a name during dynamic and ad-hoc DH exchanges that result in a temporal key T1 that may be used to establish a secure channel bridging realms R1 and R2. A contextual hint or policy may be supplied to a given SKDC that allows/denies SKDC interactions between R1 and R2.

For example, a hotel guest check in process may include the hotel realm name "Hotel_Name Room 100" that is supplied with the guest's registration confirmation documentation. A report certified by DANE may present the same name to a display device within the IoT network. A guest may verify the documented name and displayed name(s) match, thereby authorizing SKDC:R1↔SKDC:R2 interactions. Subsequently, the temporal key T1 may be used to protect an exchange that delivers a group key K1 to SKDC: R2, where it responds to devices in R2 issuing the GroupKeyFetch message.

Figure 9:
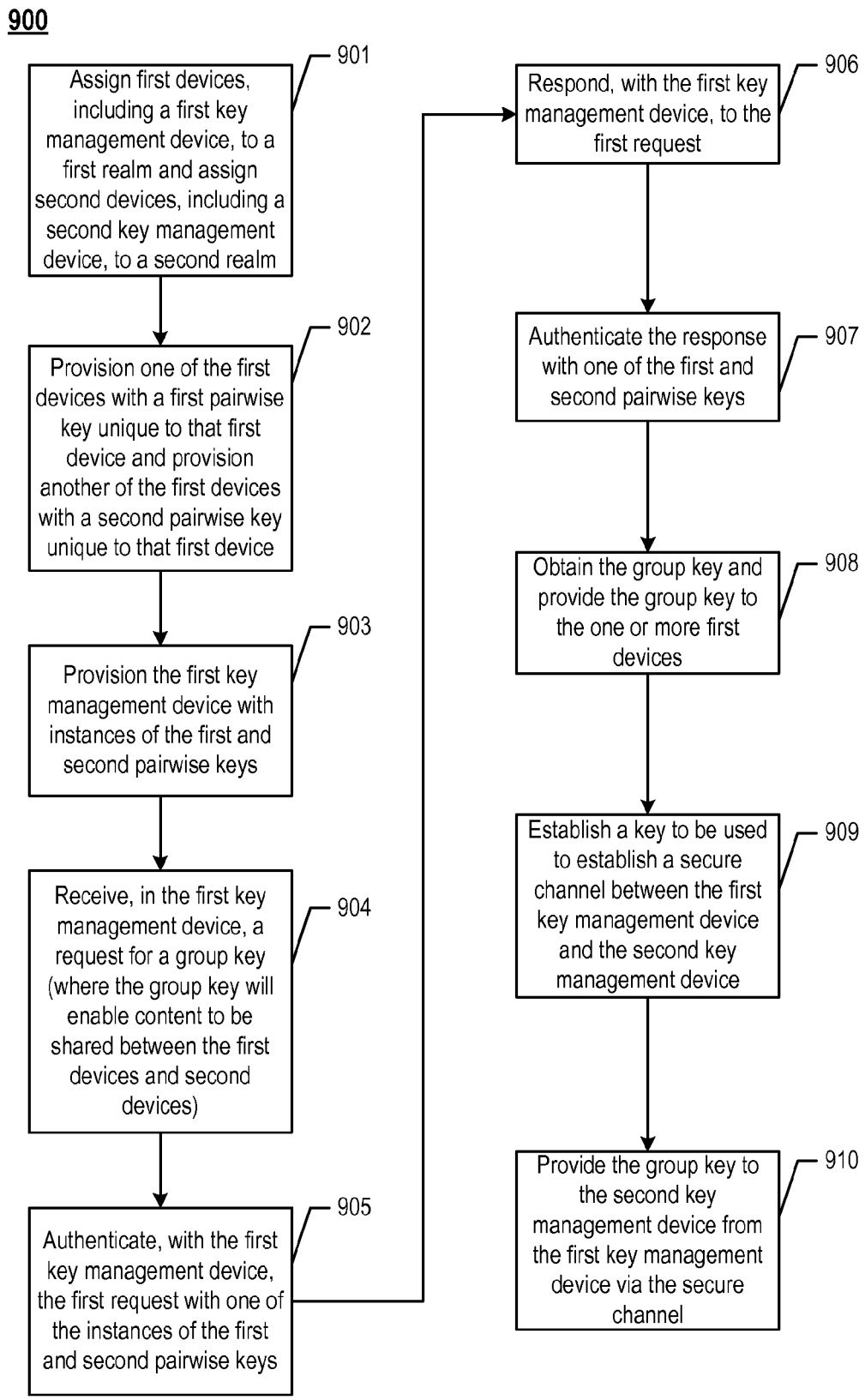
FIG. 9 is a flow chart for a process in an embodiment.

Referring now to FIG. 1, shown is a block diagram of a system overview showing SKDC(s) in autonomous IoT network(s) distributing a group content key K1. Note that a DANE service may assign realm names to SKDC(s). FIG. 9 includes a process 900 in an embodiment. Regarding FIGS. 1 and 9, block 901 includes assigning first devices, including a first key management device, to a first realm and assigning second devices, including a second key management device, to a second realm. DANE service 101 may issue certificates 110, 111 regarding the inclusion of devices within realms. For example, each of devices 104, 105, 106 may include certificates certifying their inclusion within a first realm 102 and each of devices 107, 108, 109 may include certificates certifying their inclusion within a second realm 103.

Block 902 includes provisioning device 105 with a first pairwise key unique to that device and provisioning device 106 with a second pairwise key unique to that device. Block 903 includes provisioning the first key management device 104 with instances of the first and second pairwise keys. Block 904 includes receiving, in first key management device 104, a request for a group key. This request may come from any of devices 105, 106, 107, 108, 109 where requests from devices 108, 109 would be sent via device 107.

Block 905 includes device 104 authenticating the request with one of the instances of the first and second pairwise keys (if the request comes from devices 105 or 106). Block 906 includes responding, with the first key management device 104, to the first request. Block 907 includes authenticating the response with one of the first and second pairwise keys using one of devices 105, 106.

Block 908 includes device 104 obtaining the group key (e.g., creating the key or retrieving a previously made key from storage) and providing the group key to one or more of devices 105, 106. Block 909 includes establishing a key to be used to establish a secure channel between the first key management device and the second key management device. Block 910 includes providing the group key (encrypted and sent via the secure channel) 112 to the second key management device 107 from the first key management device 104 via the secure channel.

Figure 2:
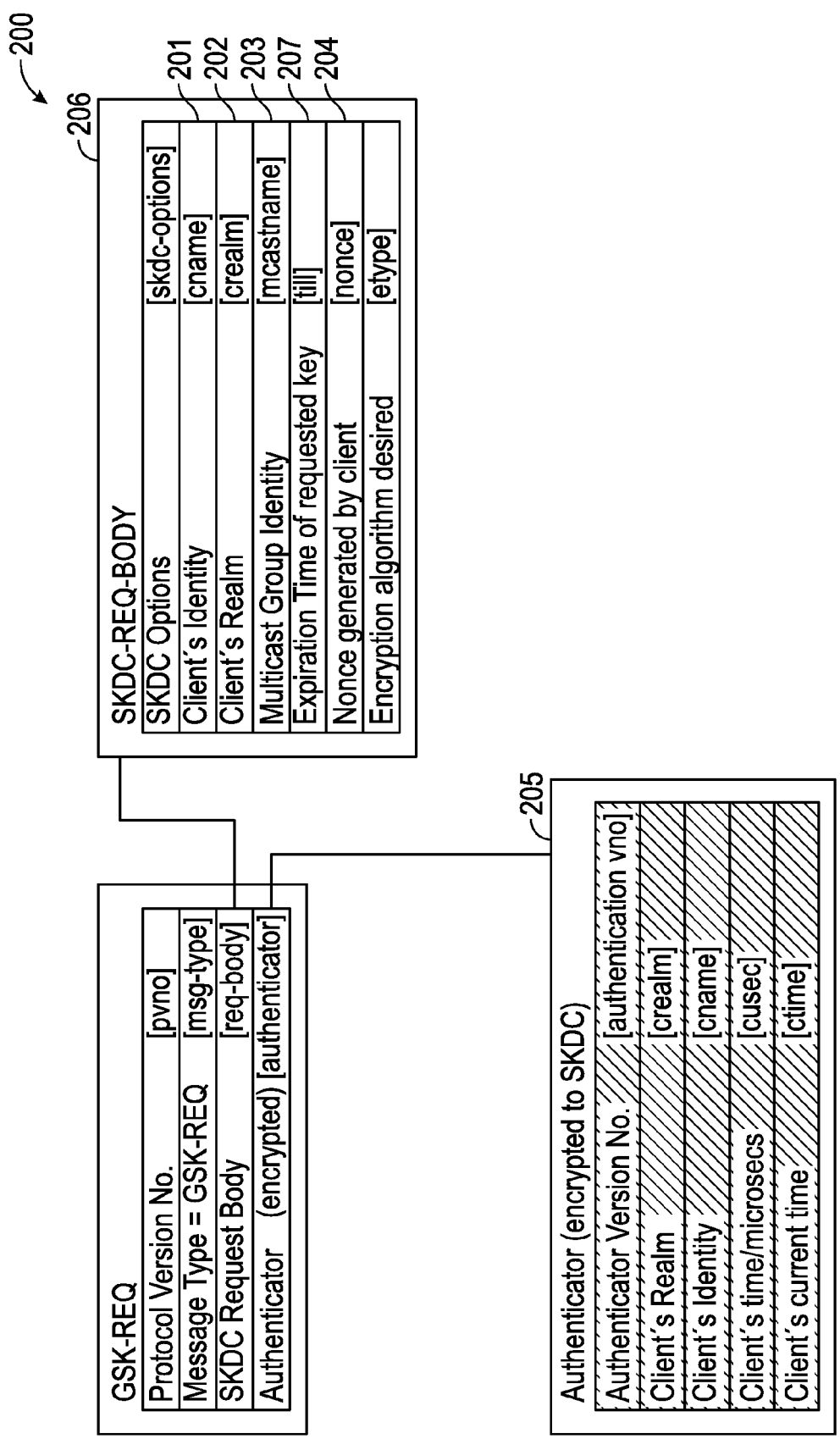
FIG. 2 is an illustration of a Group Key Request Message in an embodiment.

Referring now to FIG. 2, shown is an illustration of a Group Key Request Message 200 in accordance with an embodiment. The Group Key Request Message 200 originates from a requesting device (e.g., device 105) and is sent to a key management device (e.g., device 104) where the message instructs the key management device to create a group symmetric key, with the context for the key supplied within the request message body. This context may include an identity of a client requesting creation of the group key and a realm to which the client belongs. The context may include a multi-cast group name and realm context, an expiration date when the multi-cast group key shall expire, and authorization permissions that may be applied to the data protected by the group key or permissions related to the use of the group key. The permissions or privileges may include, for example, READ, WRITE, COPY, MODIFY, DELETE, DISTRIBUTE, and DELEGATE privileges. A request message may also include an authenticator section (205), encrypted to the SKDC (104), that may be used to authenticate the sender (105). The request body may also be protected with the same key as the authenticator and may include a cryptographic hash of the body that is encrypted with the encrypted part. In another embodiment, the authenticator may be digitally signed with an asymmetric key. Element 205 may include a client name, client realm, timestamp of client.

Message 200 allows the IoT device to specify group key details including the mcastname, otherwise known as the group topic. A group topic may include, for example and using the hotel room example made above, "room settings" may be such a group topic. For example, a thermostat and refrigerator in a hotel room may be in R1 and the hotel guest's mobile computing nodes (e.g., smartphone and laptop) may be in R2. All four of these devices may wish to communicate about matters that concern "room settings" that range from room and refrigerator temperature to WiFi settings. Other values within Message 200 may ensure the group key has limited scope and is protected from replay and other integrity attacks. The authenticator establishes that the requesting device is known to the SKDC. In FIG. 2 the request provides the identity of the device issuing the request 201, the device's realm 202, group topic 203, and anti-reply provisions (e.g., nonce) 204. Authenticator 205 includes many of the same fields as the request body 206 but is encrypted with the device key for the device that sends the request.

Figure 3:
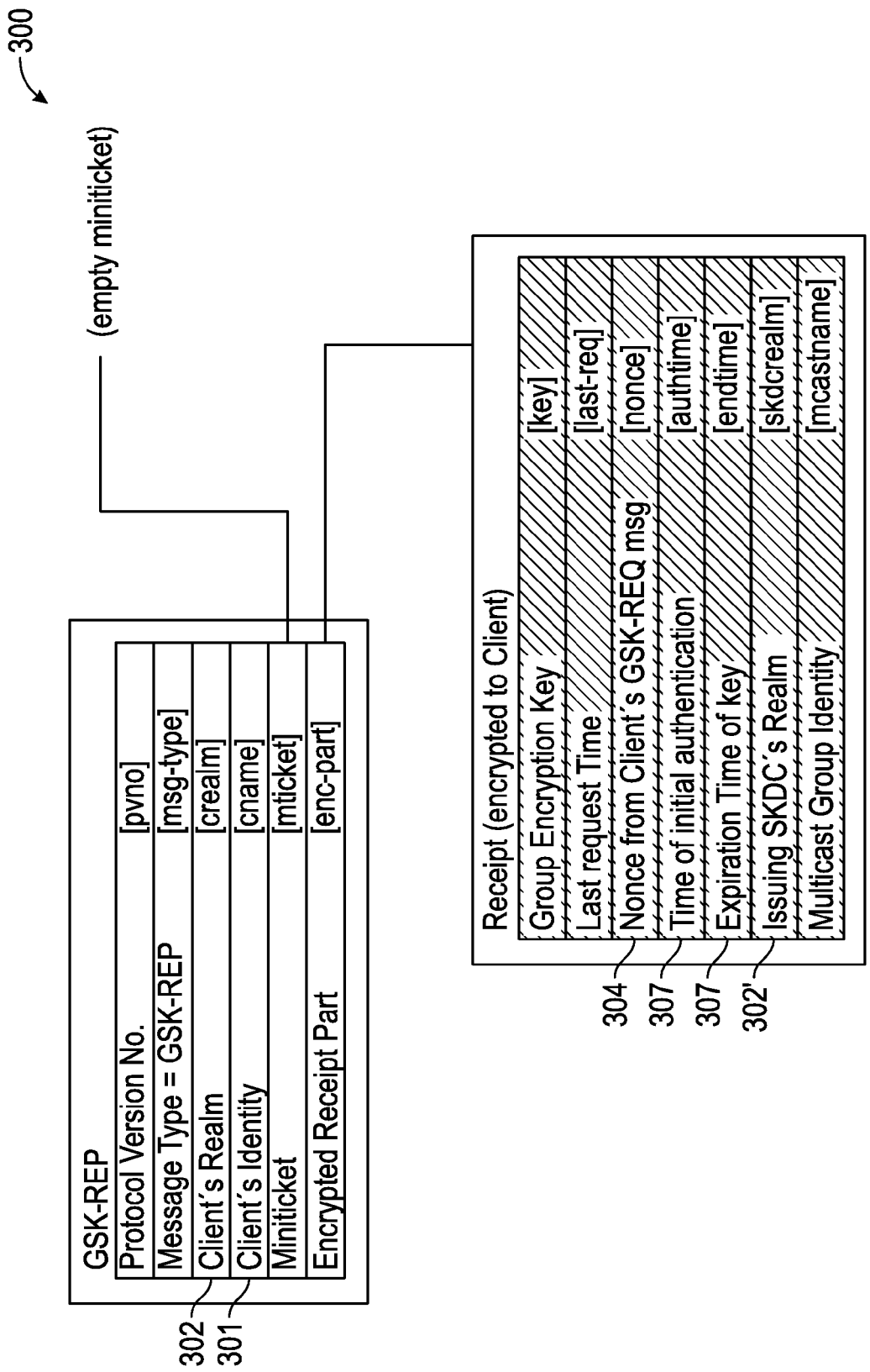
FIG. 3 is an illustration of a Group Key Response Message in an embodiment.

Referring now to FIG. 3, shown is an illustration of a Group Key Response Message in accordance with an embodiment. A Group Key Response Message is used to acknowledge a Group Key Request Message 200 that identifies the original requestor in the message body. It may also include a Receipt section encrypted using a key that only the original requestor possesses. It may contain the group key originally requested with the context as specified in the original request or modified as appropriate by the SKDC at issuance. The requesting entity (105) may use the key to protect content intended for the group named by the multi-cast name according to the permissions restrictions supplied as context in the receipt. As shown, the group key response message inherently acknowledges receipt of the group key request and then creates the group key K1. Since there may be multiple users of K1, a mini-ticket is not issued as part of the response. The receipt, however, does allow the requesting device to authenticate that the SKDC is known within the context of the autonomous IoT network. If the requesting device has a DANE certificate, the SKDC realm name may be verified independently. The reply includes various fields analogous to those of the request (e.g., 201-301; 202-302, 204-304, 207-307).

Figure 4:
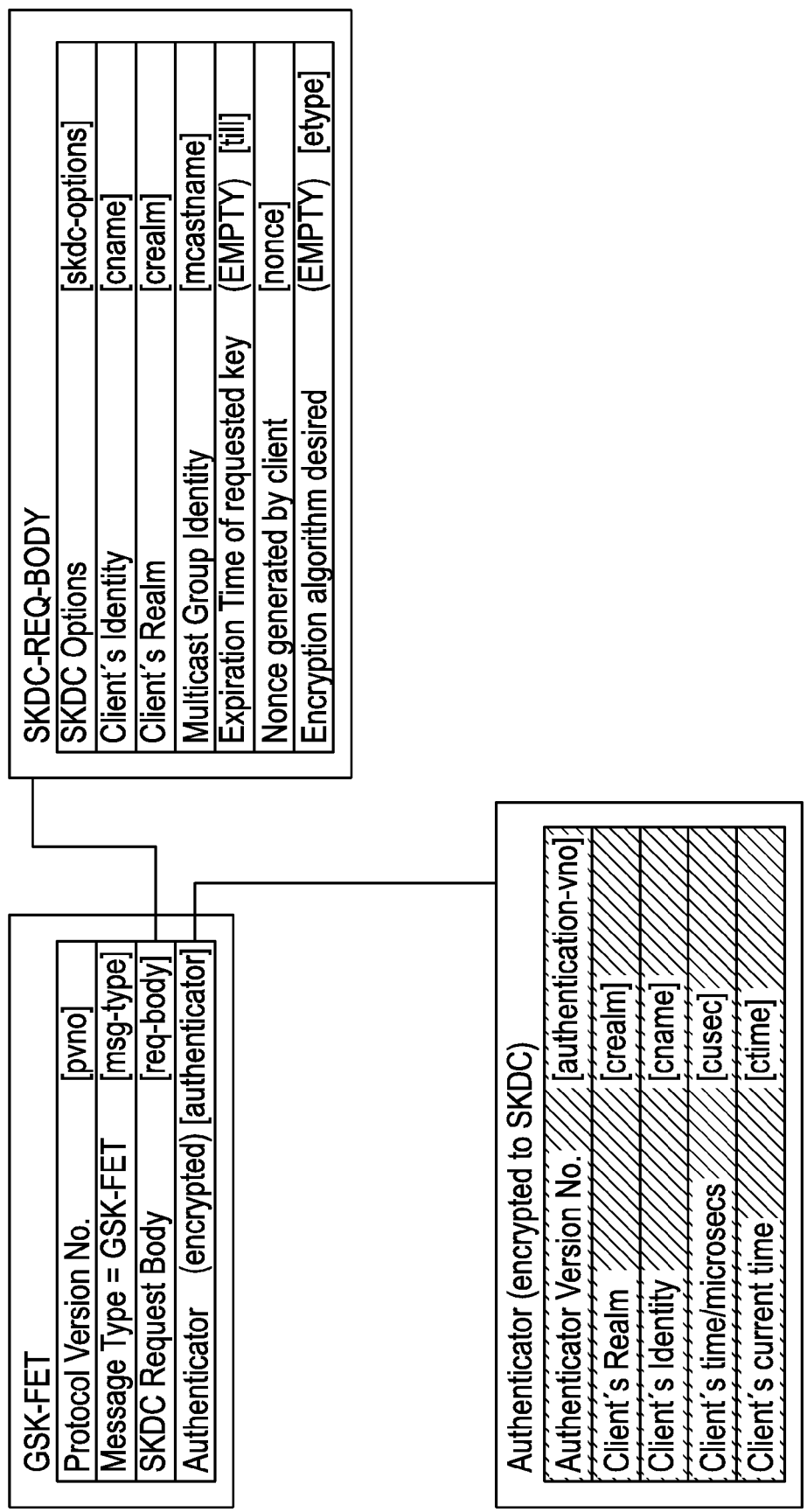
FIG. 4 is an illustration of a Group Key Fetch Message in an embodiment.

Referring now to FIG. 4, shown is an illustration of a Group Key Fetch Message in accordance with an embodiment. When the IoT device is ready to perform a group key operation, whether encrypting for consumption by the group of content that originally was published by the group key requestor or decrypting previously published content, the device issues a fetch message that instructs the SKDC to return the group key K1 as part of the deliver message (addressed in FIG. 5). The fetch message includes various fields analogous to those of the request, including items such as protocol version, client identity (e.g., device 105), client realm (e.g., realm 102), multicast group identity, aspects concerning key expiration, anti-reply considerations (e.g., nonce), and the like.

Figure 5:
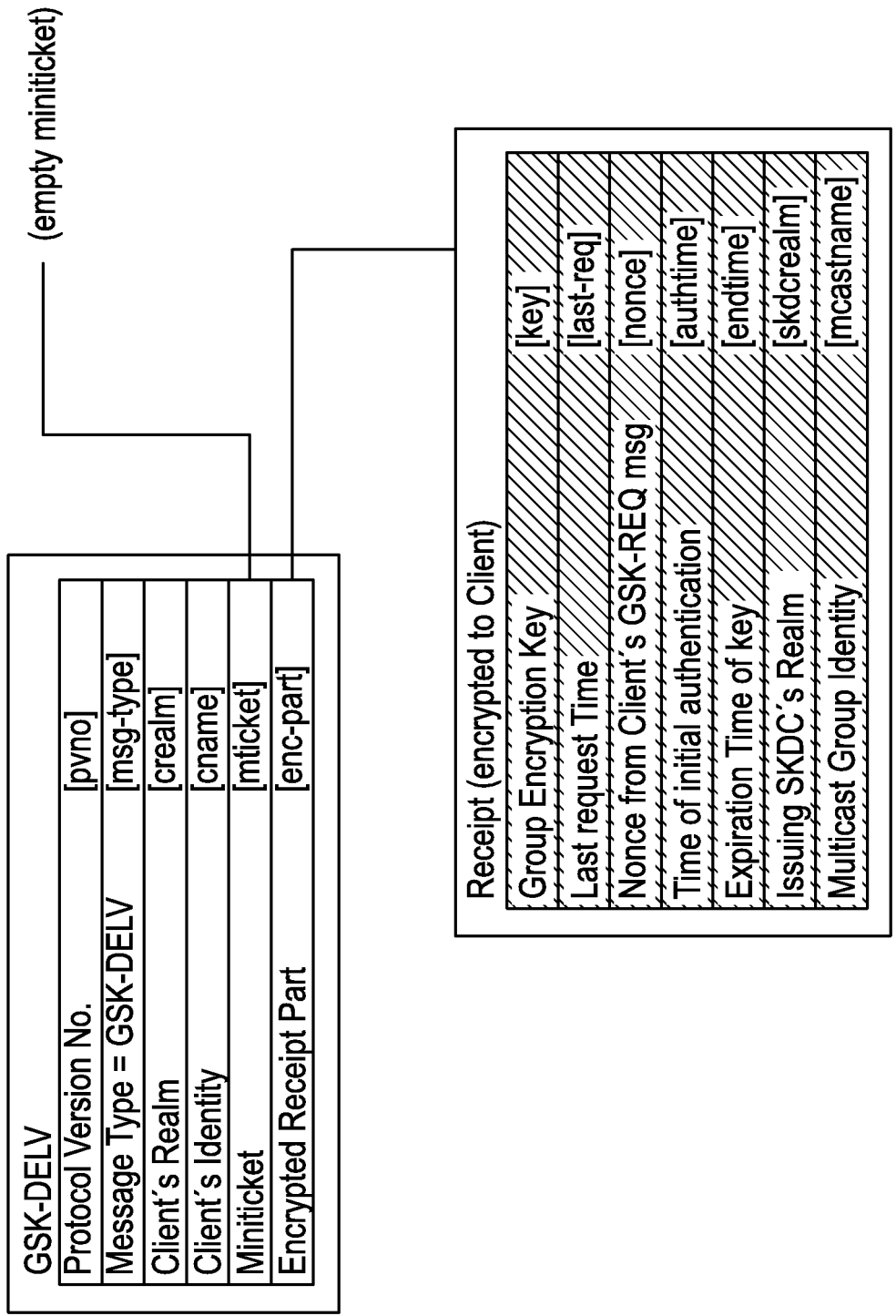
FIG. 5 is an illustration of a Group Key Deliver Message in an embodiment.

Referring now to FIG. 5, shown is an illustration of a Group Key Deliver Message in accordance with an embodiment. The deliver message returns the group key K1 encrypted by the pairwise PSK shared between the SKDC and requesting device. This authenticates the message. K1 may be used by the IoT device to encrypt/decrypt group content. The topic (mcastname) is included so that group members are able to maintain proper context when using the key. The deliver message includes various fields analogous to those of the request, including items such as protocol version, client identity (e.g., device 105), client realm (e.g., realm 102), multicast group identity, aspects concerning key expiration, anti-reply considerations (e.g., nonce), and the like.

The original requestor (which made the request of FIG. 2) is the publisher of content while the entities that fetch the key (FIG. 3) are consumers of the content. The permissions (not shown) in the various request (FIG. 2), reply (FIG. 3), fetch (FIG. 4), and deliver (FIG. 5) may be interpreted/applied differently depending on whether the role for a device is that of publisher or consumer. Namely, the publisher may be limited in the type and format of content that may be published and the consumer may be limited in the ways in which content may be consumed and re-distributed.

Note that if the IoT device D1 were from a different realm R2, then D1 would request the group key from R2 SKDC. In response, SKDC:R2 discovers the request is for a foreign SKDC realm where a new request is made on behalf of SKDC:R2 to SKDC:R1. The devices may use DH key exchange to establish T1, which is used to protect the Receipt and Authenticator portions of the group key management messages. DH exchanges may apply several techniques for establishing trust in the opposite entity including signing key exchange messages using a manufacturer's key/certificate such as Intel EPID, TCG TPM Attestation Identity Key (AIK) or other embedded credentials. It may further be established using previously negotiated context such as a PIN or other attribute data and further augmented with the exchange of an attestation hash of the device's local TEE configuration and memory state that may be cross-checked with a whitelist. Subsequently, R2 is in possession of K1 and may now honor the original request from D1:R2 by issuing a GroupKeyDeliver message authenticated by SKDC:R2 keys.

Embodiments enable use of a group key manager/SKDC by an IoT device within an autonomous IoT network. An SKDC may interact across realms to negotiate a dynamic ad-hoc key to authenticate cross-realm interactions. A contextual value/PIN or namespace approval may be used to further authenticate cross-realm interactions between SKDCs. In addition, a DANE service may be used to authorize and assign a realm namespace to a SKDC in an IoT network.

A pre-shared key may be used by a SKDC and an IoT device to authenticate a device to an SKDC and vice versa. An on-boarding process may be used to establish an IoT device name associated with a PSK and to collect device trustworthiness attributes using an attestation protocol.

In some embodiments the techniques described herein may be implemented within a trusted execution environment (TEE) such as Intel® SGX, Intel® MemCore, Intel® CSE, Intel® VT-X, Intel® IOT-OS with Smack, or ARM TrustZone, etc. to protect an SKDC service in an IoT device. Note that group keys, SKDCs and multiple realms may be used to form a virtual IoT network that may exchange encrypted group content such as sensor data, streaming data and command-and-control signals.

IoT device environments often require a high degree of autonomy to ensure safe or survivable operation under adverse operating conditions such as an evacuation route control system in the event of a building fire or other natural disaster. Under such exceptional conditions access to a key management server or certificate authority may not be possible. Hence, devices may need to be provisioned with symmetric credentials that do not depend on a central service to either distribute the key or to facilitate verification of a key. The TEE plays a role in protecting such credentials from attackers who may introduce false emergencies (e.g., pulling of a fire alarm switch) to cause the system to switch to a less secure but safety optimized operational mode. Embodiments, however, ensure operational mode switches remain secure with equivalent or even better security to that of a TEE. For example, an embodiment may include a symmetric key "ticket" issued for the purpose of protecting the system while in a "safety critical mode" and not authorized outside of such mode. The TEE may ensure the device has properly detected the safety critical mode before authorizing use of the ticket. Both a publisher and subscribers may employ TEE environments that enforce safety constraint on key use.

The semantics of pairwise credentials asserts that if a device-A knows a paired device-B shares a pairwise key, only devices A and B share that key. Use of a pairwise key can be used by device-A to authenticate device-B by asserting that if the authentication challenge was not created by device-A, then only device-B could have supplied the challenge. Pairwise keys can be used to establish secure communication between devices A and B that protect data integrity and confidentiality.

Figure 8:
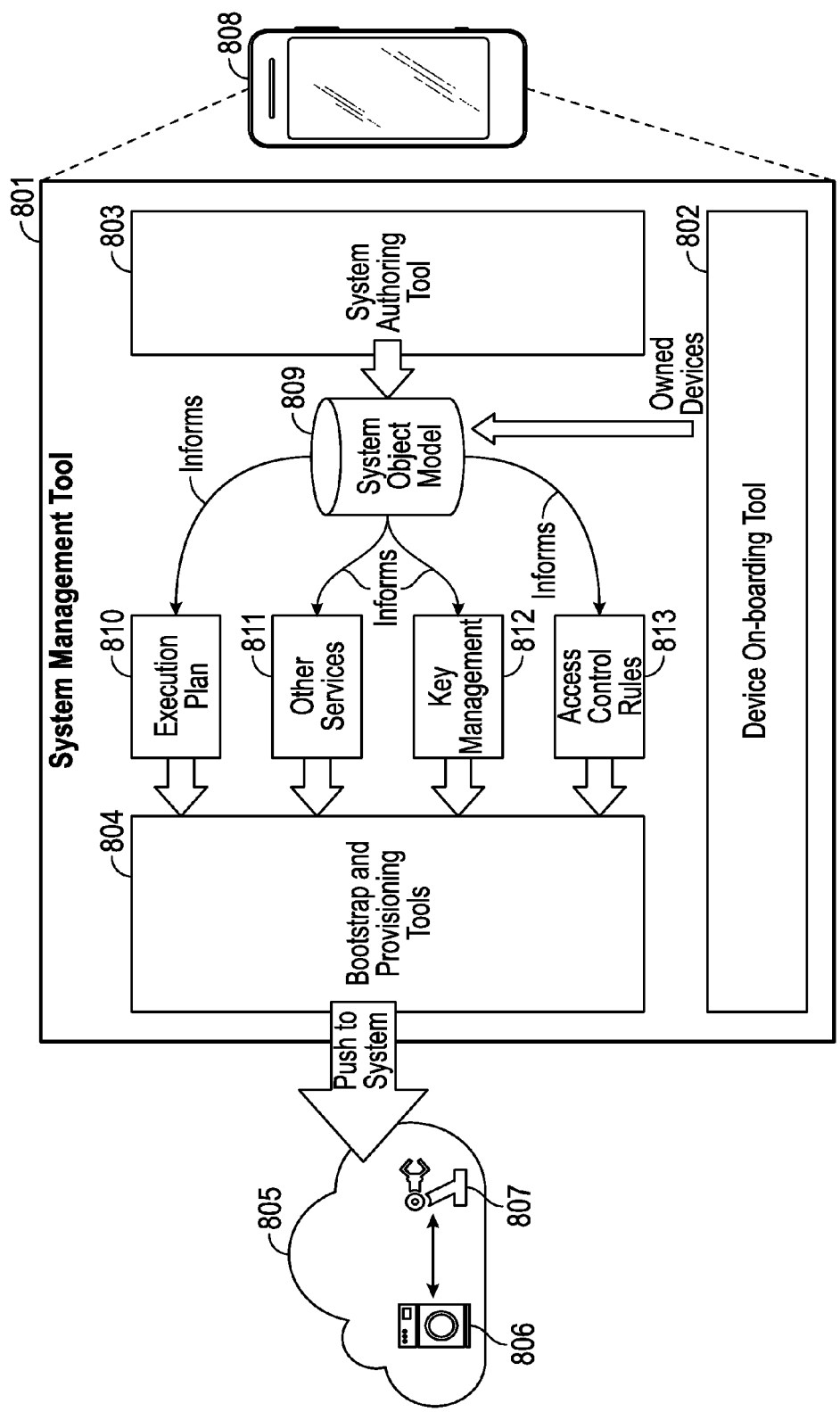
FIG. 8 is a block diagram of an on boarding tool in an embodiment.

Regarding "on-boarding", the term refers to a process through which a device 808 is introduced into an environment or realm. FIG. 8 shows a system management tool 801 that includes an on-boarding tool 802 in an embodiment. It also shows several other tools useful for provisioning an IoT system. The tool may consist of several disparate or combined tools; a Device On-boarding Tool (DOT) 802, System Authoring Tool (SAT) 803 and a Bootstrap and Provisioning Tool (BPT) 804. The DOT establishes which physical devices (e.g., devices 806 washing machine, 807 robotic arm) are owned by the system 805 and are available to the system object model 809. The SAT provides a user interface for designing various interaction semantics between devices. The BPT establishes a connection with each device needing provisioning by discovering devices in need of provisioning. Alternatively, devices can track their provisioning status and seek provisioning of a BPT service. When a connection is established, the PSK for the device may be used to establish a secure connection. The BPT may provision security relevant resources at that time, including access control lists (ACLs), credentials and other configuration data. The system object model 809 informs communicates various environment/realm details between system 805 and device 808, such as execution plan 810, other services 811, key management (e.g., algorithms or protocols used for keys within the system) 812, and system access control rules 813. Execution plan 810 may include, for example, a distributed IoT application consisting of a code script and a resource model for an IoT device D1; a second code script and resource model for a second IoT device D2; and so forth for a third and fourth or more devices such that the system of scripts interacts with the resource model of the respective devices to achieve a prescribed result. Services 811 may include, for example, firmware, an OS image or an application image software update service; a network configuration service; an attestation/whitelist/blacklist analysis service; a reputation analysis service; a global threat intelligence (GTI) service; an enterprise policy orchestration (ePO); and/or a security incident event management (STEM) service. System access control rules 813 may include, for example, ACLs that are configured and provisioned to an IoT device to be locally enforced, ACLs that are centrally managed and locally enforced, and/or ACLs that are enforced by a gateway on behalf of IoT devices that are accessible only through the gateway device.

Regarding the provisioning of PSKs, in an embodiment, security resource provisioning follows device "on-boarding". Device provisioning objectives enable new devices to interact with existing devices securely. This involves establishing security credentials that are used to authenticate each device with every other device with which it needs to interact. Credentials contain the keys used to establish a secure communication channel and to evaluate access rights. Among the first credentials provisioned are for services used to further the provisioning activity. Provisioning services use credentials having pre-shared keys that are in turn used to secure the communication channel over which additional provisioning activities may continue. There are many methods for provisioning PSKs, some of which may be based on a device generating a key and then communicating the key to the SKDC after engaging in a DH protocol with the SKDC to generate a secure path between the two nodes.

Figure 6:
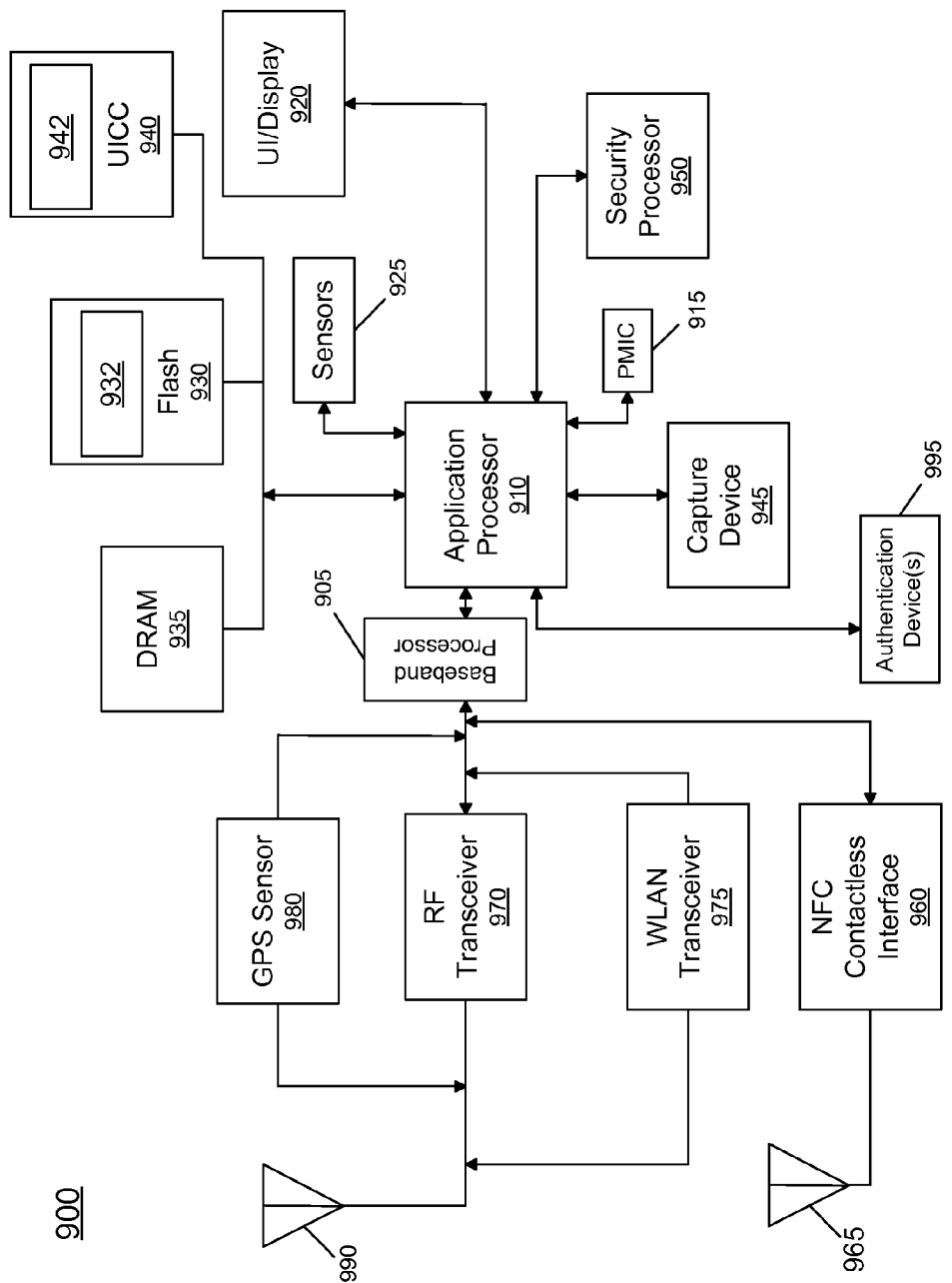
FIG. 6 is a block diagram of an system in accordance with an embodiment.

Referring now to FIG. 6, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 6, a universal integrated circuit card (UICC) 940 comprises a subscriber identity module, which in some embodiments includes a secure storage 942 to store secure user information. System 900 may further include a security processor 950 (e.g., Trusted Platform Module (TPM)) that may couple to application processor 910. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 6, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 7:
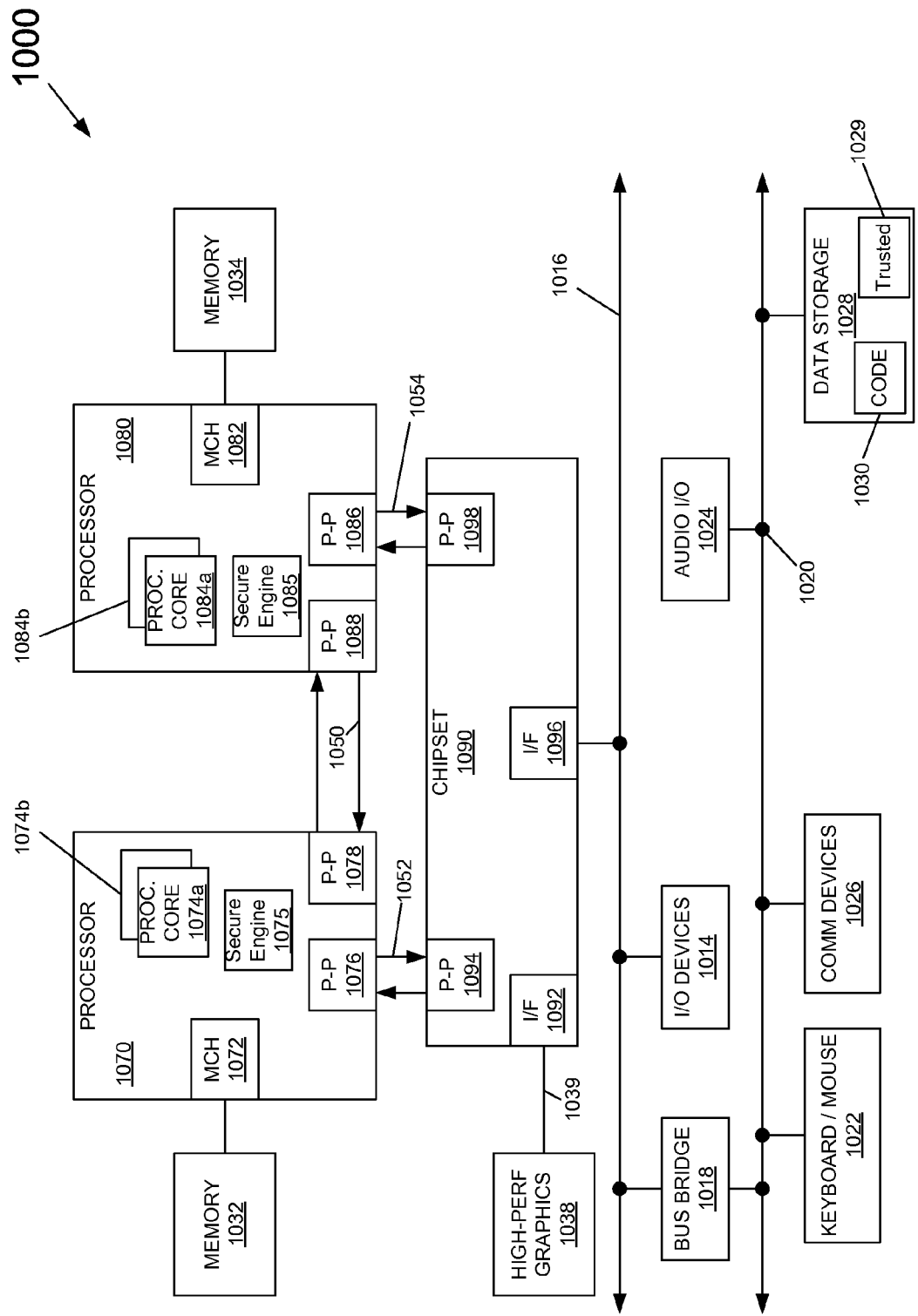
FIG. 7 is a block diagram of a system in accordance with another embodiment.

Referring now to FIG. 7, shown is a block diagram of a system in accordance with another embodiment of the present invention. As shown in FIG. 7, multiprocessor system 1000 is a point-to-point interconnect system such as a server system, and includes a first processor 1070 and a second processor 1080 coupled via a point-to-point interconnect 1050. As shown in FIG. 7, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations, IoT network onboarding or so forth.

Still referring to FIG. 7, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 7, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 7, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 7, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Example 1a includes at least one computer readable storage medium comprising instructions that when executed enable a system to: receive, in a first key management device of a first autonomous network associated with a first realm, a request for a group key to enable content to be shared between one or more first devices of the first autonomous network and one or more second devices of a second autonomous network associated with a second realm, the second autonomous network having a second key management device; obtain the group key and provide the group key to the one or more first devices from the first key management device; establish a temporal key to be used to establish a secure channel between the first key management device and the second key management device; and provide the group key to the second key management device from the first key management device via the secure channel, to enable the second key management device to provide the group key to the one or more second devices.

As used herein, to "receive" and the like includes either a push or a pull action. For example, the SKDC may have a request pushed to it from a device or the SKDC may pull the request from a device. The same is true with "provide" and the like. Providing a key may include pushing the key to a device or having a device pull the key from the SKDC or even directing the device to some storage location where the device may get the key.

In an embodiment, before establishing the temporal key please note the first and second autonomous networks are independent of each other. There is no pairing or authentication between any member of one network with any member of the other network.

Embodiments are not limited to use of a temporal key to establish the secure channel and any number of symmetric keys and the like may be used in other embodiments.

As used herein, an example of a "request" and a "reply" include "GSK-REQ" and "GSK-REP", however "GSK-FET" may also be considered a request and "GSK-DEL" may also be considered a reply. Further details regarding such requests and replies are located at, for example, https://tools.ietf.org/id/draft-hardjono-ace-fluffy-00***txt.

In example 2a the subject matter of Example 1a can optionally include instructions to establish the temporal key based on context known to both of the first and second key management devices.

For example, such context may include a personal identification number (PIN).

In example 3a the subject matter of Examples 1a-2a can optionally wherein the context is based on environmental conditions of the first and second key management devices.

In example 4a the subject matter of Examples 1a-3a can optionally include instructions to establish the temporal key via a Diffie-Hellman protocol that is based on the context.

For example, such environmental conditions may be based off accelerometer or audio sensing that provides a PIN value that is established over an ancillary channel between nearby devices (e.g., having physical proximity based on the physical limitations embodied in the ancillary channel techniques) that then communicate with each other based on the shared value. Such an example may include the "sound" of a click made when two devices contact each other in a mating protocol. The sound profile may serve as a shared value between two parties of a DH key exchange. See, for example, U.S. Pat. No. 8,903,315, assigned to Intel Corporation, Santa Clara, Calif., U.S.A. The above example are non-limiting and other possibilities include, for example, ultrasonic emitter/receiver communications; QR code display/camera interactions; haptic vibration/motion sensor interactions, nearfield communications (NFC) or (IR) infrared communications, body-area-networks, and the like.

In example 5a the subject matter of Examples 1a-4a can optionally include instructions to receive the request from one of the one or more first devices.

In example 6a the subject matter of Examples 1a-5a can optionally include instructions to receive the request from one of the one or more second devices via the second key management device.

In example 7a the subject matter of Examples 1a-6a can optionally include wherein: a first of the one or more first devices includes a first pairwise key unique to the first of the one or more first devices; a second of the one or more first devices includes a second pairwise key unique to the second of the one or more first devices; the first key management device includes instances of the first and second pairwise keys; and the at least one medium comprises instructions to authenticate the request to the first key management device: (a) before creating the group key, (b) based on the first and second pairwise keys, and (c) in response to receiving the request; the at least one medium comprises instructions to mutually authenticate the first and second of the one or more first devices to the first key management device: (a) before creating the group key, (b) based on the first and second pairwise keys, and (c) in response to receiving the request.

In another version of example 7a the subject matter of Examples 1a-6a can optionally include wherein: a first of the one or more first devices includes a first pairwise key unique to the first of the one or more first devices; a second of the one or more first devices includes a second pairwise key unique to the second of the one or more first devices; the first key management device includes instances of the first and second pairwise keys; the at least one medium comprises instructions to authenticate the request to the first key management device: (a) before obtaining the group key, (b) based on at least one of the first and second pairwise keys, and (c) in response to receiving the request; and the at least one medium comprises instructions to mutually authenticate the first and second of the one or more first devices to the first key management device: (a) before obtaining the group key, (b) based on the first and second pairwise keys, and (c) in response to receiving the request.

The mutual authentication includes the first and second of the one or more first devices being authenticated to the first key management device and the first key management device being authenticated to the first and second of the one or more first devices.

In example 8a the subject matter of Examples 1a-7a can optionally include instructions to encrypt the group key with one of the instances of the first and second pairwise keys and then provide the encrypted group key to one of the first and second of the one or more first devices.

In example 9a the subject matter of Examples 1a-8a can optionally include instructions to encrypt the content with the group key and communicate the encrypted content to one or more of the second devices.

In an embodiment, with a group key R1:D1 can talk directly to R2:D1 without going through SKDCs. Once group members have a copy of the symmetric group key any member can both encrypt and decrypt messages. An embodiment uses multiple keys that allow each participant to have a key dedicated for encryption (while subscribers only decrypt). This may be used with, for example, embodiments when there are few publishers and many subscribers and where subscribers are not authorized to be publishers. The TEE may enforce the key use constraints as defined by the Ticket or Receipt context.

In example 10a the subject matter of Examples 1a-9a can optionally include instructions to self-assign a namespace, corresponding to the first realm, to the first key management device without third party approval.

IoT devices may be involved in scenarios where either the client or server or both devices are mobile and where connectivity is local (e.g., NFC, Bluetooth, IR, ultrasonic, haptic, and the like). Access to a central naming authority to both register a dynamically selected name or to verify a dynamically selected name may be impractical. A solution that enables privacy of device interactions involves dynamically selecting a device identifier. Identifier re-negotiation need occur only if both domains happen to select the same name. If device identifiers are selected at random, the probability of collision is low given a true source of entropy. For example, an Intel® Corporation digital random number generator (DRNG) is an example of a true random number generator (RNG) that is known to have low probability of repeating generated values.

In example 11a the subject matter of Examples 1a-10a can optionally include instructions to autonomously register the self-assigned namespace with the third party.

In some scenarios the IoT device may desire to be known by a well-known name to promote a brand, trademark or slogan. A self-assigned namespace benefits from a third party naming entity by allowing the naming entity to detect duplicate names. It differs from a naming authority such as a CA or DNS service in that it does not assign or select names—it only tests for prior registration.

In example 12a the subject matter of Examples 1a-11a can optionally include instructions to assign names to the one or more first devices via the first key management device, which is a namespace authority, without third party approval.

A namespace authority ensures that the devices operating in the context of the 'user's' network use a device identifier known to be unique among the members of the network. A namespace authority may be involved during the commissioning and decommissioning of a device on a network by establishing (e.g., assigning/vetting) the identifier and cross checking it with other device identifiers known to be participants in the network. Detection of an unknown identifier constitutes a security threat or possible attack.

In example 13a the subject matter of Examples 1a-12a can optionally include wherein: creating the group key and providing the group key to the one or more first devices includes creating a plurality of instances of the group key and providing the plurality of instances of the group key to the one or more first devices; and the plurality of instances include a plurality of symmetric keys and no asymmetric keys.

In an embodiment asymmetric keys co-exist with symmetric keys. Intel® EPID is a group asymmetric key that may also be used to authenticate the group symmetric key. This may be achieved by signing the symmetric key (implying only an existing group member could have originated the use of the key)—but the identity of the originator is not disclosed. This preserves anonymity within the group while facilitating intra-group secure publish and subscribe.

In example 14a the subject matter of Examples 1a-13a can optionally include wherein: the first key management device is included in the one or more first devices and the second key management device is included in the one or more second devices; the at least one medium comprises instructions to authenticate only the first key management device, and none of the remaining one or more first devices, to only the second key management device, and none of the remaining one or more second devices; none of the one or more first devices have a preshared key with any of the one or more second devices.

Such an embodiment greatly eases the amount of pairing that must occur between devices such as, without limitation, devices of different realms.

In example 15a the subject matter of Examples 1a-14a can optionally include instructions to: authenticate the first key management device to one of the one or more first devices based on a key pair distributed between the first key management device and the one of the one or more first devices; and receive the request in response to authenticating the first key management device to the one of the one or more first devices.

In example 16a the subject matter of Examples 1a-15a can optionally include wherein: the first key management device includes a first security processor having out-of-band (OOB) non-volatile first memory that stores the temporal key that is non-visible to a first operating system (OS) for the first key management device; and the at least one medium comprises instructions to encrypt the group key with the temporal key while the temporal key is OOB and within the first security processor.

In example 17a the subject matter of Examples 1a-16a can optionally include wherein obtaining the group key includes creating the group key.

For example, obtaining the key may include creating the key or it may entail retrieving a previously created key from storage, such as storage in a security processor.

In example 18a the subject matter of Examples 1a-17a can optionally include instructions to obtain the group key and provide the group key to the one or more first devices and the second key management device, from the first key management device, without reliance on a certificate authority or a central key server.

In other words, certain actions may concern a server such as registering a realm name and the like but the actually provisioning of the group key is done within the realms themselves wherein the realms may include one or more constrained devices.

In example 19a the subject matter of Examples 1a-18a can optionally include instructions to form the first realm and include the one or more first devices in the first realm without reliance on a certificate authority or a central key server.

This allows a domain to operate cohesively as a constellation or "network" of devices that are "owned" by the domain. The creation, operation and deletion of the domain can occur autonomously—without third party oversight and control.

In example 20a the subject matter of Examples 1a-19a can optionally include wherein: at least one of the one or more first devices is constrained based on the at least one of the one or more first devices having no user credential; the first autonomous network is autonomous and is not a content delivery network based on the first autonomous network not relying on a distributed system of servers to communicate within the first realm or with the second realm; the first realm includes an autonomous grouping of the one or more first devices; and the temporal key includes a session key.

As used herein "constrained" refers to an execution environment that is absent one or more critical resources typical of computation (e.g., memory, storage, computing, networking capacity). The constraint may be threshold based where some level of operation existing resources is depleted, but meaningful function/behavior is achieved. Survivability science is the science of meaningful computation subsequent to loss of computational resources. Some devices may be manufactured to be operating in "survival" mode by default. They can perform some duties but not all that may otherwise be expected of a device. For example, a constrained device may be constrained because it may lack credentials due to credential caching and replacement policy that deletes a less used credential in order to find resources for a more immediately used credential. The constraint of the storage for credentials requires the device to more frequently consult a key management service to re-obtain the deleted credential. As a result, the constrained device has a loss of autonomy or possibly loss of security and privacy due to its need to more frequently access credential servers that exist outside of a local realm that includes the device.

As used herein, a "realm" names a grouping of devices where operational behaviors, interaction semantics and security semantics may differ considering intra- vs. intergroup operation. It may represent a logical group of content.

As used herein, "autonomous" refers to a mode of operation where a device or service may perform a function that has a lifecycle component from start to finish and re-start without outside interaction or mediation. Autonomy facilitates dynamic meeting, pairing, and/or discovery such that device interaction does not need to follow a prescribed pathology by a 'master' or 'central' or 'controller' entity.

Example 21a includes at least one computer readable storage medium comprising instructions that when executed enable a system to: establish first pairwise keys between a first device and a first key management device of a first autonomous network associated with a first realm; encrypt a request for a group key with one of the first pair wise keys; send, to the first key management device, the encrypted request for a group key to enable content to be shared between one or more first devices of the first autonomous network and one or more second devices of a second autonomous network associated with a second realm, the second autonomous network having a second key management device; and obtain the group key, which is encrypted with the one of the pair wise keys, from the first key management device.

In Example 22a the subject matter of Example 21a can optionally include instructions to obtain the group key from the second key management device via the first key management device.

In Example 23a the subject matter of Examples 21a-22a can optionally include instructions to: receive a message from one of the one or more second devices without the message being sent via either of the first and second key management devices; decrypt the message based on the group key; wherein the system is included in one of the one or more first devices.

Example 24a includes an apparatus comprising: at least one memory; and at least one processor, coupled to the memory, to perform operations comprising: receive, in a first key management device of a first autonomous network associated with a first realm, a request for a group key to enable content to be shared between one or more first devices of the first autonomous network and one or more second devices of a second autonomous network associated with a second realm, the second autonomous network having a second key management device; obtain the group key and provide the group key to the one or more first devices from the first key management device; establish a temporal key to be used to establish a secure channel between the first key management device and the second key management device; and provide the group key to the second key management device from the first key management device via the secure channel, to enable the second key management device to provide the group key to the one or more second devices.

In Example 23a the subject matter of Examples 21a-22a can optionally include wherein the operations comprise receiving the request from one of the one or more second devices via the second key management device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a system to:
   receive, in a first key management device of a first autonomous network associated with a first realm, a request for a group key to enable content to be shared between one or more first devices of the first autonomous network and one or more second devices of a second autonomous network associated with a second realm, the second autonomous network having a second key management device and the request being from one of the one or more first devices;
   obtain the group key and provide the group key to the one or more first devices from the first key management device;
   establish a temporal key to be used to establish a secure channel between the first key management device and the second key management device; and
   provide the group key to the second key management device from the first key management device via the secure channel, to enable the second key management device to provide the group key to the one or more second devices.

2. The at least one medium of claim 1 comprising instructions to establish the temporal key based on context known to both of the first and second key management devices.

3. The at least one medium of claim 2, wherein the context is based on environmental conditions of the first and second key management devices.

4. The at least one medium of claim 2 comprising instructions to establish the temporal key via a Diffie-Hellman protocol that is based on the context.

5. The at least one medium of claim 1, wherein:
   a first of the one or more first devices includes a first pairwise key unique to the first of the one or more first devices;
   a second of the one or more first devices includes a second pairwise key unique to the second of the one or more first devices;
   the first key management device includes instances of the first and second pairwise keys;
   the at least one medium comprises instructions to authenticate the request to the first key management device: (a) before obtaining the group key, (b) based on at least one of the first and second pairwise keys, and (c) in response to receiving the request; and
   the at least one medium comprises instructions to mutually authenticate the first and second of the one or more first devices to the first key management device: (a) before obtaining the group key, (b) based on the first and second pairwise keys, and (c) in response to receiving the request.

6. The at least one medium of claim 5 comprising instructions to encrypt the group key with one of the instances of the first and second pairwise keys and then provide the encrypted group key to one of the first and second of the one or more first devices.

7. The at least one medium of claim 1 comprising instructions to encrypt the content with the group key and communicate the encrypted content to the one or more second devices.

8. The at least one medium of claim 1 comprising instructions to self-assign a namespace, corresponding to the first realm, to the first key management device without third party approval.

9. The at least one medium of claim 8 comprising instructions to autonomously register the self-assigned namespace with the third party.

10. The at least one medium of claim 8 comprising instructions to assign names to the one or more first devices via the first key management device, which is a namespace authority, without third party approval.

11. The at least one medium of claim 1, wherein:
obtaining the group key and providing the group key to the one or more first devices includes creating a plurality of instances of the group key and providing the plurality of instances of the group key to the one or more first devices; and
the plurality of instances includes a plurality of symmetric keys.

12. The at least one medium of claim 11, wherein:
the first key management device is included in the one or more first devices and the second key management device is included in the one or more second devices;
the at least one medium comprises instructions to authenticate only the first key management device, and none of the remaining one or more first devices, to only the second key management device, and none of the remaining one or more second devices; and
none of the one or more first devices have a preshared key with any of the one or more second devices.

13. The at least one medium of claim 12 comprising instructions to:
authenticate the first key management device to one of the one or more first devices based on a key pair distributed between the first key management device and the one of the one or more first devices; and
receive the request in response to authenticating the first key management device to the one of the one or more first devices.

14. The at least one medium of claim 1 wherein:
the first key management device includes a first security processor having out-of-band (OOB) non-volatile first memory that stores the temporal key that is non-visible to a first operating system (OS) for the first key management device; and
the at least one medium comprises instructions to encrypt the group key with the temporal key while the temporal key is OOB and within the first security processor.

15. The at least one medium of claim 1, wherein obtaining the group key includes creating the group key.

16. The at least one medium of claim 1 comprising instructions to obtain the group key and provide the group key to the one or more first devices and the second key management device, from the first key management device, without reliance on a certificate authority or a central key server.

17. The at least one medium of claim 16 comprising instructions to form the first realm and include the one or more first devices in the first realm without reliance on a certificate authority or a central key server.

18. The at least one medium of claim 1, wherein:
at least one of the one or more first devices is constrained based on the at least one of the one or more first devices having no user credential;
the first autonomous network is autonomous and is not a content delivery network based on the first autonomous network not relying on a distributed system of servers to communicate within the first realm or with the second realm;
the first realm includes an autonomous grouping of the one or more first devices; and
the temporal key includes a session key.

19. At least one non-transitory computer readable storage medium comprising instructions that when executed enable a system to:
establish first pairwise keys between a first device and a first key management device of a first autonomous network associated with a first realm;
encrypt a request for a group key with one of the first pairwise keys;
send, to the first key management device from one of one or more first devices of the first autonomous network, the encrypted request for a group key to enable content to be shared between the one or more first devices and one or more second devices of a second autonomous network associated with a second realm, the second autonomous network having a second key management device; and
obtain the group key, which is encrypted with the one of the pairwise keys, from the first key management device.

20. The at least one medium of claim 19 comprising instructions to obtain the group key from the second key management device via the first key management device.

21. The at least one medium of claim 19 comprising instructions to:
receive a message from one of the one or more second devices without the message being sent via either of the first and second key management devices; and
decrypt the message based on the group key;
wherein the system is included in one of the one or more first devices.

22. An apparatus comprising:
at least one memory; and
at least one processor, coupled to the memory, to perform operations comprising:
receive, in a first key management device of a first autonomous network associated with a first realm, a request for a group key to enable content to be shared between one or more first devices of the first autonomous network and one or more second devices of a second autonomous network associated with a second realm, the second autonomous network having a second key management device and the request being from one of the one or more first devices;
obtain the group key and provide the group key to the one or more first devices from the first key management device;
establish a temporal key to be used to establish a secure channel between the first key management device and the second key management device; and
provide the group key to the second key management device from the first key management device via the secure channel, to enable the second key management device to provide the group key to the one or more second devices.

* * * * *